Jan. 10, 1939.  F. KREIS  2,143,325
COGWHEEL CHANGE-SPEED GEARING
Filed Feb. 6, 1937
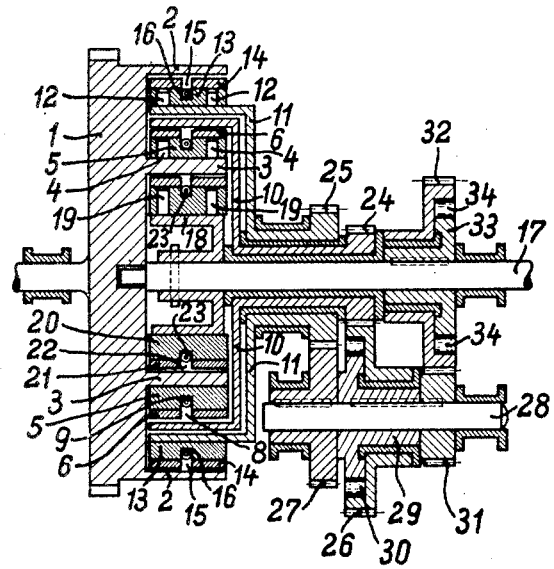
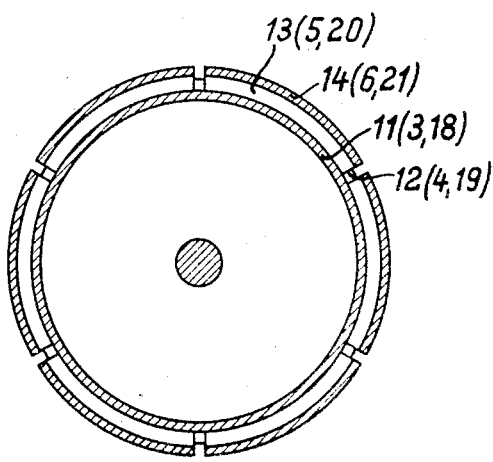
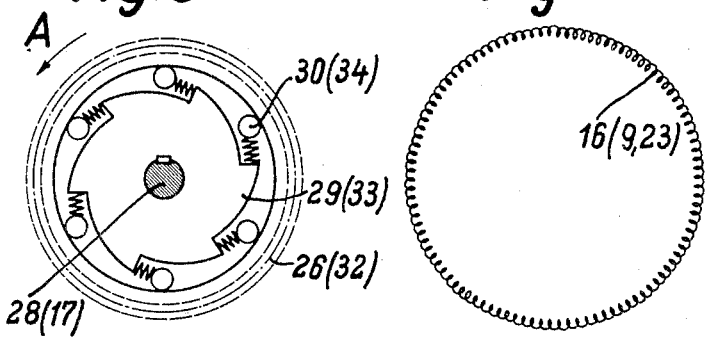
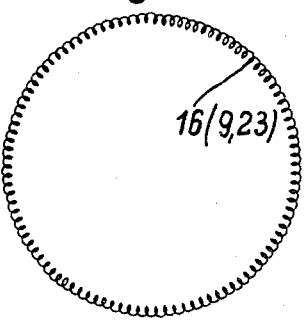
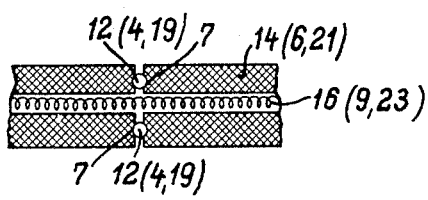
Inventor:
Fritz Kreis,
By Potter, Pierce & Scheffler,
Attorneys.

Patented Jan. 10, 1939

2,143,325

UNITED STATES PATENT OFFICE 2,143,325

COGWHEEL CHANGE-SPEED GEARING

Fritz Kreis, Berlin-Lichterfelde, Germany, assignor to Gesellschaft zur Konstruktion und Verwertung Automatisch-Mechanischer Getriebe m. b. H., Berlin, Germany Application February 6, 1937, Serial No. 124,501
In Germany March 18, 1936

3 Claims. (Cl. 74—336)

The present invention relates to automatically shifting change speed transmissions, particularly applicable to motor vehicles. Automatically shifted gear wheel change speed gearings for motor vehicles are known in which a special centrifugally shifted clutch is provided between the engine and each gearing stage, and each of the stages below the highest speed includes a free running member that permits over-running in each lower stage upon shifting to the following higher stages.

With one of these constructional forms the fly-weights for all couplings are attached to the motor flywheel so that their number of revolutions is always the same as that of the motor, in consequence whereof every step of the gearing can be run in a comparatively small range of the number of revolutions, whereas in general the tendency is to be able to run the vehicle in every step within as large a number of revolutions as possible.

In another known type of automatically shifted change speed transmission the centrifugal members connecting the first stage are directly driven from the engine shaft and the flying weights of the clutches for shifting into the following stages are all arranged on the driven shaft so that shifting into the second and higher stages is directly dependent upon the speed of the vehicle. This construction has the disadvantage that the range of speed in each stage is quite limited.

In the present invention, this disadvantage is overcome by providing an automatically shifting change speed gearing having more than two gearing stages in which the flying weights of the clutch for shifting into the first stage are driven directly from the engine shaft, and in which the flying weights of the clutches for shifting into any one of the following stages are driven by the gear wheels of the corresponding stage, or in the case of the last stage, directly from the driven shaft.

In order to render possible this manner of driving, the fly-weights for the coupling of the first step of the gearing are supported at the motor fly-wheel, whereas the fly-weights for the following steps are located at coupling halves connected with the driving wheels of the individual steps by the intermediary of hollow shafts arranged within one another and supported, in the case of the employment of a direct speed, loosely upon the transmitting gearing shaft which, in turn, carries one half of the coupling actuating the direct speed at the end opposite the motor. It is suited to the purpose in view to arrange the members concerned in such a manner that all couplings lying in the range of the motor flydisk lie concentrically within one another.

The steps of the gearing and their free-running members are preferably so arranged that none of the cogwheels of the gearing runs with a greater number of revolutions than that of the motor at the time being.

With a three-step gearing the free running member of the first step of the gearing is, according to this invention, built into the appertaining driven cog-wheel located upon the countershaft, whereas the free-running member of the second step of the gearing is built into the cog-wheel located upon the transmitting shaft of the gearing and being driven by the countershaft.

The invention is illustrated diagrammatically and by way of example on the accompanying drawing on which Figure 1 is an axial section through a three-step gearing designed according to this invention. Figure 2 is partly a front-view of, and partly a transverse section through, a cylindrical jacket pertaining to a coupling and serving as carrier for the fly-weights which are arranged on said jacket. Figure 3 shows a part of two adjacent fly-weights. Figure 4 is a view of an annular helical spring preventing the fly-weights of a coupling from being prematurely flung outwardly, and Figure 5 is a diagrammatic representation of one of the gearing wheels with a free-wheel built thereinto.

On the drawing, 1 (Fig. 1) denotes the flywheel of a motor (not shown). On the driving side this wheel is provided with two concentric annular or cylindrical flanges or extensions 2 and 3, of which the latter (3) is provided with pairs of guide pins 4 spaced in distances of 60° and serving to carry round with them, and to guide, flying weights 5 arranged on this extension. Said weights are designed as circularly curved segments and are provided with friction-coverings 6. In order to prevent said weights from being shifted axially, the guide pins 4 engage grooves 7 (Fig. 3) provided in the ends of said segments.

In the middle portion of each fly-weight 5 is a recess 8 into which is placed an annular helical spring 9, the object of which is to prevent a too early outward movement of the above-mentioned segments. When the segments are moving outwardly, they contact with the jacket-shaped portion of a drum 10 from which the first step is driven, as will be explained hereinafter.

The second speed connections include a drum member 11 which has a cylindrical portion concentric with the flange 2 of the fly-wheel and is adapted to be coupled thereto by means of centrifugally influenced fly-weights 13 carried upon the cylindrical portion of the drum 11 and connected thereto by guide pins 12 similar to the guide pins 4. The fly-weights are again designed as circularly curved segments and are provided on the outer circumference with friction-coverings 14. Furthermore, there is again provided in the middle portion of said segments, on the outer circumference thereof, a recess 15 into which an annular helical spring 16 is placed, the purpose of which is the same as the purpose of the spring 9.

The gear shaft 17 which transmits the turning moment to the driving axle carries at the end opposite the fly-wheel, and supported in this wheel, a drum 18 which is firmly connected with said shaft 17. On the jacket-portion of this drum are again pairs of bolts 19 and fly-weights 20 likewise designed as circularly curved segments and provided with friction-coverings 21. Also these segments have each a recess 22 in the middle portion and an annular helical spring 23 in these recesses. The friction-coverings of the fly-weights are pressed against the inner surface of the cylindrical extension 3 connected with the fly-wheel 1.

The drum 10 is firmly connected with the wheel 24 of the first step by which the countershaft is provided with a sleeve portion 10' journalled on the shaft 17 and driven, whereas the drum 11 is also provided with a sleeve portion 11' concentric with and journalled on the sleeve portion 10' and firmly connected with the cog-wheel 25 of the second step likewise driving the countershaft. The drum 10 may be made in one piece with its associated sleeve portion 10' and gear 24 and the drum 11 and its associated parts may be similarly formed. The cog-wheels 24 and 25 mesh with the wheels 26 and 27, of which the latter is firmly keyed to the countershaft, whereas the wheel 26 is connected up, by the intermediary of a free-wheel, to a roll carrier 29 firmly secured to a countershaft 28. To this shaft is keyed also a wheel 31 from which, by the intermediary of a wheel 32, the gear-shaft 17 is rotated. The wheel 32 runs loosely on a roll carrier 33 firmly secured to the shaft 17, free-running rolls 34 being inserted between the wheel 32 and the roll-carrier 33.

The manner of operation of the gearing is as follows:

When the fly-wheel 1 is driven by the motor, similar rotary movement is positively imparted to the fly-weights 5 by the guide pins 4 affixed to the cylindrical extension 3 of said wheel. The annular helical spring 9 prevents said weights from being flung outwardly at a low number of revolutions of the motor for instance when it runs without load. When this number of revolutions has been surpassed, the friction-coverings 6 of the weights are flung outwardly and are pressed against the drum 10 gradually imparting rotary motion thereto until the drum is rotating at the same speed as the fly-wheel. Thus the first step is put in operation and the turning movement is transmitted from the cog-wheel 24 which is connected with the drum 10 to the cog-wheel 26 and further, by the intermediary of the countershaft 28, to the cog-wheel 31, and again from this cog-wheel to the cog-wheel 32 and the shaft 17. When these movements are taking place (compare Fig. 5), the wheels 26 and 32 rotate, relatively to their roll carriers 29 and 33, in the direction indicated by the arrow A; the free-rolls 30, or 34 respectively, get clamped fast in the appertaining carriers and rotate them, or their shafts 28 and 17 respectively, whereupon the vehicle commences to run slowly with the first step—

Now also the wheel 27 on the countershaft 28 is rotated and drives the cog-wheel 25, or the drum 11 respectively which is connected with this wheel. Suppose, the number of revolutions of the motor in the first step relatively to the countershaft, be reduced in the ratio 2 : 1 and the cog-wheel pair 27, 25 of the second step have a ratio of transmission of 1 : 1, then the number of revolutions of the first step can increase to double the number of this step until the second step, the coupling of which shall have the same centrifugal effect, or the same pressing-on pressure respectively, as the first step at the same number of revolutions, gets into the power flux. When the friction coverings 14 have been pressed against the cylindrical extension 2 and the drum is rotating with the fly-wheel, the counter-shaft 28 performs the same number of revolutions as the motor, or as the drum 11 respectively. The free-roll carrier 29 which is firmly connected with the countershaft 28 disengages itself from the clamping action of the free-rolls 30 in the direction A as soon as its number of revolutions surpasses the number of revolutions of the cog-wheel 26, and leads relatively to this wheel, whereby the second step has been put in operation without there having arisen the necessity to disengage the coupling of the first step.

Supposing, furthermore, that the cog-wheel pair 31, 32 has a reduction ratio of transmission of 2 : 1. When the vehicle is running with the second step the number of revolutions of the driven shaft 17 relatively to the number of revolutions of the motor would be half this number. When now the centrifugal coupling of the third step, at the same number of revolutions, exerts the same effect as the couplings of the first and of the second step, then also the coupling of the third step will get into the power flux by the pressing-on of the friction coverings 21 against the inner surface of the cylindrical extension 3 which is connected with the fly-wheel. Now again the free-roll carrier 33 disengages itself from the clamping action of the free-rolls 34 and leads relatively to the cog-wheel 32 in the direction A. There are now all three couplings in direct engagement without any mutual retardation of the individual steps among one another.

I claim:

1. An automatically shifting change speed transmission comprising a driving member, a driven member, a countershaft having a unidirectional drive gear connection to said driven member, means providing a low-speed driving connection between said drive and driven members including a first driven element adapted to be connected to said drive member and having a unidirectional drive gear connection to said countershaft, means providing a second speed driving connection between said drive and driven members including a second driven element adapted to be connected to said drive member and having a drive gear connection to said countershaft, means providing a direct driving connection between said driving and driven members including a third driven element secured to said driven member and adapted to be connected to said driving element, a centrifugal clutch mechanism carried by said driving member and operable in accordance with the speed of said driving member to control the connection between said driving member and said first driven element, and centrifugal clutch mechanisms carried by said second and third driven elements operable in accordance with the speed of said second and third elements respectively to control the connection between said elements and said driving member, whereby during operation of a preceding stage the centrifugal clutch mechanism of a following stage is actuated to establish connection with the driving member by a counterdrive from said countershaft through the gearing connections of said following stage.

2. An automatically shifting change speed transmission comprising a driving member, a driven member, a countershaft having a unidirectional drive gear connection to said driven member, means providing a low speed stage driving connection between said drive and driven members including a first driven element adapted to be connected to said drive member and having a unidirectional drive gear connection to said countershaft, means providing a second speed stage driving connection between said drive and driven members including a second driven element adapted to be connected to said drive member and having a drive gear connection to said countershaft, means providing a direct driving stage connection between said driving and driven members including a third driven element secured to said driven member and adapted to be connected to said driving element, and serially operated centrifugal clutch mechanisms for connecting said drive member to said first, second, and third driven elements, respectively, the centrifugal clutch mechanism for connecting the first stage being mounted on said driving member, the centrifugal clutch mechanism for connecting the second and third stages being mounted on the second and third driven elements, respectively, whereby during the operation of a lower stage the centrifugal clutch mechanism of a following stage is actuated from said countershaft through its gearing connection therewith to establish connection with the driving member.

3. An automatically shifting change speed transmission comprising a driving member, a driven member, a countershaft having a unidirectional drive gear connection to said driven member, means providing a low stage unidirectional driving connection between said drive and driven members through said countershaft, means providing a second stage driving connection between said drive and driven members through said countershaft, means providing a direct driving connection between said drive and driven members, each of said means including a driven element adapted to be connected to said drive member, a centrifugal clutch mechanism carried by said drive member for connecting the driven element of the low stage to said drive member, and centrifugal clutch mechanisms carried by each of said other driven elements for connecting said elements to said drive member, whereby during operation through lower speed driving connections, the centrifugal clutch mechanism of the next higher speed ratio is actuated by the driving connection means then in operation.

FRITZ KREIS.